(12) United States Patent
García Acón et al.

(10) Patent No.: US 10,633,862 B2
(45) Date of Patent: Apr. 28, 2020

(54) CABLE ANCHORING MEANS FOR A HORIZONTAL JOINT AND CABLE ANCHORING PROCEDURE FOR A HORIZONTAL JOINT

(71) Applicant: ESTEYCO S.A.P., Madrid (ES)

(72) Inventors: Carlos García Acón, Madrid (ES); José Serna García-Conde, Madrid (ES)

(73) Assignee: ESTEYCO S.A.P., Madrid (ES)

( * ) Notice: Subject to any disclaimer, the term of this patent is extended or adjusted under 35 U.S.C. 154(b) by 0 days.

(21) Appl. No.: 15/123,372

(22) PCT Filed: Mar. 4, 2015

(86) PCT No.: PCT/ES2015/070154
§ 371 (c)(1),
(2) Date: Sep. 2, 2016

(87) PCT Pub. No.: WO2015/132436
PCT Pub. Date: Sep. 11, 2015

(65) Prior Publication Data
US 2017/0067256 A1    Mar. 9, 2017

(30) Foreign Application Priority Data
Mar. 7, 2014   (ES) .................................. 201430314

(51) Int. Cl.
*E04C 5/12*      (2006.01)
*E04H 12/12*    (2006.01)
(Continued)

(52) U.S. Cl.
CPC .............. *E04C 5/125* (2013.01); *E04C 5/085* (2013.01); *E04C 5/127* (2013.01); *E04H 12/12* (2013.01);
(Continued)

(58) Field of Classification Search
CPC .......... E04C 5/125; E04C 5/127; E04C 5/085; E04C 3/20; E04C 3/26; E04H 12/12;
(Continued)

(56) References Cited

U.S. PATENT DOCUMENTS 1,830,787 A * 11/1931 Ferry ..................... B21K 1/704
                                                            29/525
3,122,806 A *  3/1964 Lewis ....................... B66C 1/12
                                                            174/79
(Continued)

FOREIGN PATENT DOCUMENTS

EP    2253782 A1   11/2010
EP    2541047 A2    1/2013
(Continued)

OTHER PUBLICATIONS

Search report dated May 6, 2015 in corresponding application PCT/ES2015/070154; submitted herewith with a partial English trasnlation.

Primary Examiner — Joshua J Michener
Assistant Examiner — James Buckle, Jr.
(74) Attorney, Agent, or Firm — Cowan, Liebowitz & Latman, P.C.; Mark Montague

(57) ABSTRACT

Cable anchoring means for a horizontal joint between two elements, comprising: a cable partially embedded in an element, a receiving through duct provided in the other element to receive the protruding portion of said cable, traction means, fastening means and a threading device applicable on said protruding portion of said cable and comprising a part with a pointed and flexible geometry that extends coaxially with respect to said protruding portion from the free end of said protruding portion. a cable anchoring procedure for a horizontal joint between two elements, comprising: a) providing said elements; b) providing said anchoring means; c) bringing said elements close to one
(Continued)

another and threading said cable into said duct; also comprising the step c): c.1) stopping the approximation when the distance between the elements is adequate; c.2) placing said flexible part inside said duct; c.3) resuming movement.

17 Claims, 13 Drawing Sheets

(51) Int. Cl.
  E04H 12/16      (2006.01)
  F03D 13/10      (2016.01)
  F03D 13/20      (2016.01)
  E04H 12/34      (2006.01)
  E04C 5/08       (2006.01)

(52) U.S. Cl.
  CPC ............ *E04H 12/16* (2013.01); *E04H 12/342* (2013.01); *F03D 13/10* (2016.05); *F03D 13/20* (2016.05); *F05B 2240/912* (2013.01); *Y02E 10/728* (2013.01)

(58) Field of Classification Search
  CPC ......... E04H 12/16; E04H 12/14; E04H 12/22; E04H 12/28; E04H 12/34; E04H 12/342; E04H 12/344; F03D 13/20; F03D 13/10; F05B 2240/912; Y02E 10/728; F03C 13/20; F03C 13/10; E04B 1/21; E04B 1/22; E04B 1/4121; F16L 25/0027
  USPC ......... 52/223.13, 223.7, 2.21, 223.5, 651.01, 52/745.04, 745.17, 223.4, 223.5, 843, 52/848, 849
  See application file for complete search history.

(56) References Cited

U.S. PATENT DOCUMENTS

| | | | | |
|---|---|---|---|---|
| 3,137,765 A * | 6/1964 | Lanum | H02G 1/04 | 174/84 S |
| 3,522,961 A * | 8/1970 | Cave, Sr. | F16G 11/02 | 174/79 |
| 3,570,074 A * | 3/1971 | Schimmeyer et al. | F16G 11/05 | 24/122.6 |
| 3,672,006 A * | 6/1972 | Fidrych | F16G 11/02 | 24/115 N |
| 3,697,188 A * | 10/1972 | Pope | B23B 45/005 | 254/134.3 FT |
| 3,978,188 A * | 8/1976 | Schoenebeck | B29C 70/58 | 264/139 |
| 5,231,752 A * | 8/1993 | Hereford | F16G 11/05 | 24/122.6 |
| 5,480,203 A * | 1/1996 | Favalora | B25B 25/00 | 24/115 N |
| 5,582,447 A * | 12/1996 | Leon | G09F 3/0317 | 24/115 M |
| 5,735,628 A * | 4/1998 | Short | F16G 11/05 | 403/218 |
| 6,278,823 B1 * | 8/2001 | Goldner | G01V 1/201 | 385/100 |
| 6,354,596 B1 * | 3/2002 | Rodriguez | E04C 5/12 | 174/153 G |
| 6,808,350 B1 * | 10/2004 | Tooman | F16B 37/14 | 411/372.5 |
| 6,974,169 B1 * | 12/2005 | Upton | F16L 55/1652 | 24/115 N |
| 6,993,237 B2 * | 1/2006 | Cooke | G02B 6/4455 | 385/134 |
| 7,025,176 B1 * | 4/2006 | Tooman | F16N 11/00 | 118/244 |
| D521,356 S * | 5/2006 | Littrell | D8/330 | |
| 7,287,358 B2 * | 10/2007 | Zambelli | E04B 1/21 | 52/223.13 |
| D572,201 S * | 7/2008 | Scherer | D13/156 | |
| 7,665,941 B2 * | 2/2010 | Wolf | E04B 1/4157 | 411/429 |
| D635,450 S * | 4/2011 | Deese | D8/382 | |
| 7,975,519 B1 * | 7/2011 | Tooman | B21H 3/00 | 29/517 |
| D669,442 S * | 10/2012 | Bowen, III | D13/183 | |
| 8,366,367 B2 * | 2/2013 | Matlock | F16B 37/14 | 411/372.6 |
| 8,800,967 B2 * | 8/2014 | Carlson | H02G 1/081 | 254/134.3 FT |
| 9,537,293 B2 * | 1/2017 | Bennett | H02G 1/081 | |
| 9,765,521 B1 * | 9/2017 | Abbas | E04C 3/26 | |
| 9,835,228 B2 * | 12/2017 | Campbell | F16B 39/20 | |
| 9,982,434 B1 * | 5/2018 | Crigler | E04C 5/122 | |
| 2004/0041136 A1 * | 3/2004 | Ames | B66C 1/42 | 254/134.3 FT |
| 2007/0022703 A1 * | 2/2007 | Wolf | E04B 1/4157 | 52/698 |
| 2009/0044482 A1 * | 2/2009 | Tooman | E02D 27/42 | 52/699 |
| 2009/0224220 A1 * | 9/2009 | Jordan | H02G 1/081 | 254/134.3 R |
| 2010/0102286 A1 * | 4/2010 | Jordan | H02G 1/081 | 254/134.3 PA |
| 2010/0176357 A1 * | 7/2010 | Wen | G02B 6/4465 | 254/134.3 R |
| 2010/0202748 A1 * | 8/2010 | Pierce | G02B 6/54 | 385/136 |
| 2010/0258771 A1 * | 10/2010 | White | H02G 1/081 | 254/134.3 R |
| 2012/0032125 A1 * | 2/2012 | Diaz De Corcuera | B66C 1/108 | 254/131 |
| 2014/0161559 A1 * | 6/2014 | Kim | F16B 37/14 | 411/373 |
| 2014/0298737 A1 * | 10/2014 | Fernandez Gomez | E04H 12/12 | 52/220.1 |
| 2017/0328065 A1 * | 11/2017 | Sorkin | E04C 5/12 | |

FOREIGN PATENT DOCUMENTS

| | | |
|---|---|---|
| FR | 1000107 A | 2/1952 |
| FR | 2202202 A1 | 5/1974 |
| FR | 2741097 A1 | 5/1997 |
| WO | 2012168467 A2 | 12/2012 |

* cited by examiner

CABLE ANCHORING MEANS FOR A HORIZONTAL JOINT AND CABLE ANCHORING PROCEDURE FOR A HORIZONTAL JOINT

CROSS REFERENCE TO RELATED APPLICATIONS

This is a U.S. national stage of application No. PCT/ES2015/070154, filed on Mar. 4, 2015. Priority under 35 U.S.C. § 119(a) and 35 U.S.C. § 365(b) is claimed from Spanish Patent Application No. P201430314 filed on Mar. 7, 2014, the disclosure of which is also incorporated herein by reference

FIELD OF THE INVENTION

This invention relates to cable anchoring means for a horizontal joint, as well as to a cable anchoring procedure for a horizontal joint and to a cable anchoring horizontal joint, in particular for a horizontal joint between two components of a building or construction.

This invention is especially applicable to a horizontal joint located between two coaxial segments of a vertical tapered tubular construction or building, such as the shaft of a wind tower, i.e. a tower comprising a foundation, a shaft and a wind turbine. This invention is especially applicable to a horizontal joint located between two precast elements in prestressed reinforced concrete. Thereby and to simplify, throughout this description we shall make reference almost exclusively to a horizontal joint located between two precast segments of prestressed reinforced concrete for a wind tower, without this implying any limitation whatsoever to the scope of the invention.

Therefore, the main field of application of this invention is the construction industry, mainly with precast prestressed reinforced concrete, in combination with the industry of renewable or green energies, in particular wind energy.

BACKGROUND OF THE INVENTION

As is well known, wind turbines are devices capable of generating electrical energy from air currents. In order to operate, these wind turbines are mounted on top of a wind tower, which comprises a foundation, a tubular shaft and wind turbine itself.

The shaft of a wind tower usually has a height between 60 and 120 metres, and is built from heavy materials heavy such as steel and/or reinforced concrete. Likewise, the wind turbine of a wind tower is provided with very large blades, usually between 20 and 60 metres long, and parts such as the rotor and the outer cover, often called a nacelle, which have important mass.

For all the above, the total weight of a wind tower is very high, usually hundreds of tonnes.

Moreover, in view of the height of the wind towers, their shaft is usually produced in segments, usually subdivided in turn into voussoir-like parts that are transported individually to the location of use and once there are mounted in their final use position to form the shaft assembly. During the assembly process, regardless of whether it includes or not any pre-assembly stage of voussoirs for each segment, it is common to coaxially assemble tubular shaft segments. As a result, it is common for wind towers to include, between the tubular segments forming such towers, horizontal joints that are subjected to extremely high loads.

The cost associated to structures of such magnitude is, as you can imagine, very high.

Solutions for horizontal joints have therefore been proposed, often as part of global construction solutions for wind towers, in order to approach these loads economically. One of such horizontal joint solutions includes the use of cable anchoring means that include at least one tongue and grooved device for cable anchoring. With regard to this, see for example document EP 2253782 A1, especially FIG. 3, which shows a tongue and groove device for cable anchoring in a joint between tubular segments of a wind tower shaft. Basically, with specific reference to said FIG. 3 of document EP 2253782 A1 as an illustration, a tongue and grooved anchoring device is provided on respective opposite edges of a voussoir (2 bottom) of a first tubular segment (2, 3 bottom) and a voussoir (2 top) of a second tubular segment (2, 3 top) of a tower shaft (1), and includes: a cable (4*a*), that has a portion that is embedded in a fixed manner inside the first tubular segment and a portion that protrudes from the first tubular segment towards the second tubular segment; a through duct (24) on the second tubular segment, intended to receive the protruding portion of the cable; and fastening means (22) to fasten the cable in its position, apparently formed in this case by a screw or wedge device that is applied to the free end of the protruding portion of the cable once it has been passed through the through hole, as is known in the art.

However, the horizontal joints that use tongue and grooved devices for cable anchoring exhibit certain drawbacks, associated mainly to the assembly procedure, as described below.

A tubular segment is usually mounted using a descending movement, for a coaxial approximation of such tubular segment to a tubular segment that has already been placed, until the bottom edge of said tubular segment to be mounted rests either directly or using some kind of mortar on the top edge of the tubular segment that has already been placed. The cable must be threaded simultaneously with this approximation, that is, the free end of the protruding portion of the cable for a segment must be made to coincide vertically with the opening of the corresponding receiving duct in the other segment and said free end must be kept in that position as long as necessary during the descending movement of the segment to be mounted so that said free end passes through said opening and is housed in said receiving duct. But usually the axial development of the protruding portion of the cable is not straight and predetermined when starting the assembly process, but rather it has a natural shape of an axial development such that the free end of the protruding portion is not centred with respect to the opening of the corresponding receiving duct. The most simple cause is that the cable is provided on spools, which favours that the cable tends to wind itself up after installation. In particular, in cases in which the protruding portion extends upwards, the protruding portion is usually of such a length that in these cases said protruding portion flexes due to its own weight, even in the cable emerges in an entirely vertical manner. In any case, the protruding portion of the cable may already emerge with a certain inclination (see for example document ES 2407780 A2, FIG. 4) which may cause such mentioned off-centring. This usually means providing means and/or procedures intended for holding the free end of the protruding portion in coincidence with the opening of the corresponding receiving duct during said approximation movement.

Usually, the means and/or procedures intended to hold the free end of the protruding portion of the cable in coincidence with the opening of the corresponding receiving duct during said descending approximation movement include an operator holding the protruding portion of the cable in place. Since most joints include a multiplicity of tongued and grooved anchoring devices and the cables of them all must be simultaneously threaded, the threading operation involves a lot of labour as well as a serious risk to the operator, who must remain placed under a suspended and moving tubular segment during the threading operation, which is even forbidden in some legislations.

This problem is accentuated when there are cables in both directions, as is common (protruding from the both the upper segment and the lower segment), and also the operation must be performed at a certain height, with the corresponding limitations of accessibility and space available for operating when threading, fastening or wedging the cables, and in particular when tightening them, which may involve the use of jacks of considerable weight and size.

DISCLOSURE OF THE INVENTION

Therefore, an object of this invention is to provide cable anchoring means for a horizontal joint, particularly for a horizontal joint between two elements of a building or construction, which are effective and economical and allow simple, agile and safe operating procedures, especially for a horizontal joint between two precast, prestressed reinforced concrete segments of a wind tower.

In particular, this invention proposes cable anchoring means for a horizontal joint between a lower element and an upper element of a building or construction, comprising:

at least one cable embedded in a first element that is one of said upper and lower elements, such that a portion of said cable protrudes from said first element, and also said cable being a non-adhering prestressing sheathed cable, at least one receiving through duct provided in the second element which is the other of said upper and lower elements, said receiving through duct being intended to receive and house the protruding portion of said cable, and fastening means to fasten said cable in place;

said cable anchoring means also comprising an applicable threading device, preferably detachable, on said protruding portion of said cable and comprising one portion with a pointed and flexible geometry that extends in a substantially coaxial direction with respect to said protruding portion of said cable from the free end of said protruding portion of said cable.

Said flexible portion of said threading device may be made, for example, of plastic polymer or rubber. It must be understood that said cable may be formed by a single cable, or by a group of bundled but independent cables or strands, in which case said threading device acts as a cap and maintains the heads of all the independent strands fastened and joined, thus preventing any of them from separating from the others.

The anchoring means using a cable for a horizontal joint according to the invention also comprise a work platform that is joined to said lower element at least temporarily in order to perform any work required during the assembly and materialisation of the joint anchored between both upper and lower elements.

In addition, said receiving through duct may have a flared inlet stretch such that the cross-section of said receiving through duct narrows from the cable inlet opening of said receiving through duct, over at least a length of said receiving through duct. This allows having a wider diameter at the inlet opening, which facilitates the operation, and at the same time a reduced diameter at the outlet opening that is compatible with the adequate support of conventional cable anchoring plates.

With regard to the receiving through duct, its end that is opposite the cable inlet end preferably opens towards a surface support area that corresponds to a box provided on the face of the second element (see, for example, document ES 2401787 A2, especially its FIG. 3, cross-section II-II, reference 11, and its FIG. 6, reference 11). However, it may also be opened in a superficial support area corresponding with a rib on the face of the second element (see, for example, cited document EP 2253782 A1, especially FIGS. 3 and 4), or it may simply be opened on a surface support area of the face of the second element joined without interruption to the remainder of the face surface.

Another object of this invention it to provide a cable anchoring procedure for a horizontal joint, particularly for a horizontal joint between two elements of a building or construction, which is at the same time effective, economic and unsafe, especially for a horizontal joint between two precast, prestressed reinforced concrete segments of a wind tower.

In particular, this invention proposes a cable anchoring procedure for a horizontal joint between a lower element and an upper element of a building or construction, comprising the following steps:

a) providing said upper and lower elements;

b) providing cable anchoring means, comprising:

at least one cable embedded in a first element, that is one of said upper and lower elements, such that a portion of said cable protrudes from said first element, at least one receiving through duct provided in a second element which is the other of said upper and lower elements, said receiving through duct being intended to receive the protruding portion of said cable, and fastening means to fasten said cable in place;

c) moving said upper element in a substantially vertical manner towards said lower element and threading said cable into said receiving through duct until said upper element rests, either directly or using some kind of mortar, on said lower element;

said cable anchoring means also comprising a threading device that is applied, preferably in a detachable manner, on said protruding portion of said cable and comprising one part with a pointed and flexible geometry that extends in a substantially coaxial direction with respect to said protruding portion of said cable from the free end of said protruding portion of said cable;

step c) also comprising the following sub-steps:

c.1) stopping the substantially vertical movement of said upper element towards said lower element when the distance between the lower element and the upper element is such that said threading device can be placed intersecting the cross-sectional area of the cable inlet opening of said receiving through duct;

c.2) placing said flexible part of said threading device on the cable inlet opening of said receiving through duct;

c.3) resuming the substantially vertical movement of said upper element towards said lower element such that the protruding portion of said cable is housed inside said receiving through duct.

Said procedure also comprising, before step C) the step of:

d) providing a work platform, which can be definitive or temporary, joined to the head of said lower element and from which any work required for the assembly and execution of the joint may be performed.

Said procedure also comprising, after step c) the step of:

e) applying said fastening means to the free end of the protruding portion of the cable.

Said procedure may also comprise, after step c) the step of:

f) applying traction on said cable, thus applying a prestressing force on said horizontal joint.

As is known, a cable is tightened by applying traction means, usually a jack, on one of its free ends, called the active end. The other end of the cable is not used for tightening and is the passive end. The active end of said cable may be the free end that crosses said horizontal joint, in which case the traction means are operated and applied from said work platform.

However, the free end that crosses said horizontal joint may also be the passive end, in which case tightening would not be carried out from said work platform but from the other end of the cable, which may be located at a different horizontal joint located at a different height.

Said procedure may also comprise, after step c) the step of:

g) filling with a hardening material, usually a mortar or cement slurry, said through duct that houses the protruding portion of said cable.

If the path of said protruding portion is curved in its final position, said step g) will always be performed before step f).

Preferably, the lower and upper elements forming the horizontal joint are tubular segments with a tapered axial extension, and are intended to be assembled coaxially.

Therefore, during step c), which is critical for the reliability and building efficiency of said horizontal joint, a single operator would be able to thread a plurality of cables for respective cable anchoring assemblies distributed along the perimeter of a horizontal joint according to the invention, even if more than one of the respective protruding portions have the same length, since once the substantially vertical movement of said upper element towards said lower element has been stopped according to the cable anchoring procedure for a horizontal joint according to the invention the operator does not have to simultaneously thread all the cables, but may do it successively and with less risk since the upper element is not moving. After threading them all, the substantially vertical movement of said upper element towards said lower element can be resumed with all the cables duly threaded.

The procedure described in step c) and comprising the use of the threading devices disclosed in this invention also allows the use in the horizontal joint of cables that do not extend in the vertical direction of the upper or lower elements, still allowing their threading even when the movement of the upper element of the tower during assembly is essentially vertical. This may provide greater design freedom and therefore more adequate and effective designs.

In a preferred embodiment of this invention, the horizontal joint will have anchoring cables in both senses, that is, a first family of cables protruding from the base of the upper element and penetrating into through ducts provided on the head of the lower element, and also a second family of cables protruding from the head of the lower element and penetrating into through ducts provided on the base of the upper element.

In this case, the free ends of the cables of the first family that cross the joint are passive ends and are logically located below the horizontal joint. On the other hand, the free ends of the cables of the second family are active ends and are located above the horizontal joint. Therefore, in step f), the only cables that will be tightened from the work platform of said horizontal joint would be those of the second family.

In this case, the active ends of the cables of the first family will cross another horizontal joint immediately above it, from which they will be tightened.

In this case, the passive ends of the cables of the second family could be either embedded within the lower element or crossing another horizontal joint immediately below it and in which they would be applied to the corresponding fastening means.

In this case, the configuration of the horizontal joint and the geometry of the cables crossing it would be such that the distance between the work platform and the free passive end of the cables of the first family is sufficiently large to allow placing the fastening means in step e). At the same time, the distance between the work platform and the free active end of the cables of the second family is sufficiently small as to be accessible to the operators on the work platform in steps e) and f). Thus, the entire works for the assembly and materialisation of the joint are performed from said single work platform provided on step d).

BRIEF DESCRIPTION OF THE DRAWINGS

These and other features of the present invention will become evident from the following description of an embodiment thereof, provided only as an example and not in a limiting manner, with reference to the accompanying figures, wherein.

DETAILED DESCRIPTION OF AN EMBODIMENT OF THE INVENTION

Figure 1:
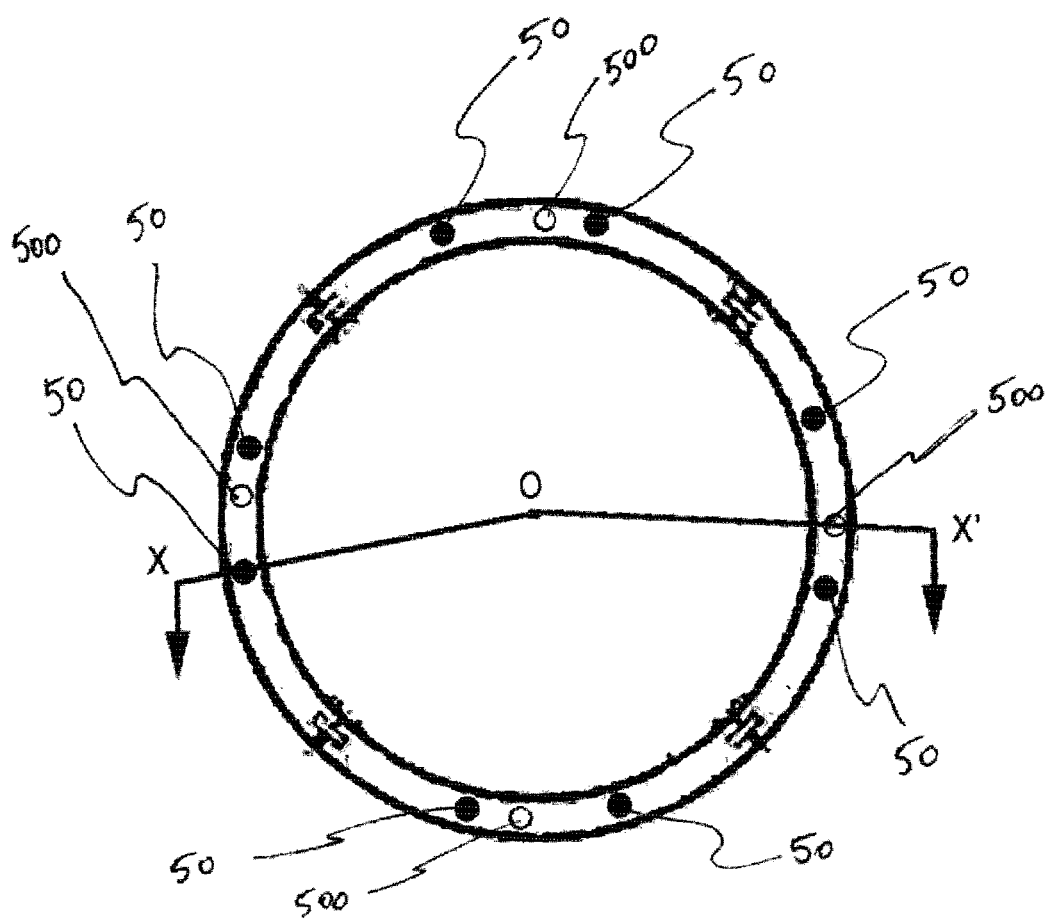
FIG. 1 is a schematic plan view of a horizontal joint that includes anchoring means according to the invention.

Initially with reference to FIG. 1, which shows a schematic plan view of a horizontal joint including cable anchoring means according to the invention. More specifically, this horizontal joint includes a plurality of cable anchoring means 50 according to the invention, combined with a plurality of bar anchoring means 500 that fall outside the scope of the invention, all these distributed evenly along the circumference of the horizontal joint.

With reference now to FIGS. 2 to 9, these illustrate a cable anchoring procedure for the horizontal joint of FIG. 1, which shall be described below.

Figure 2:
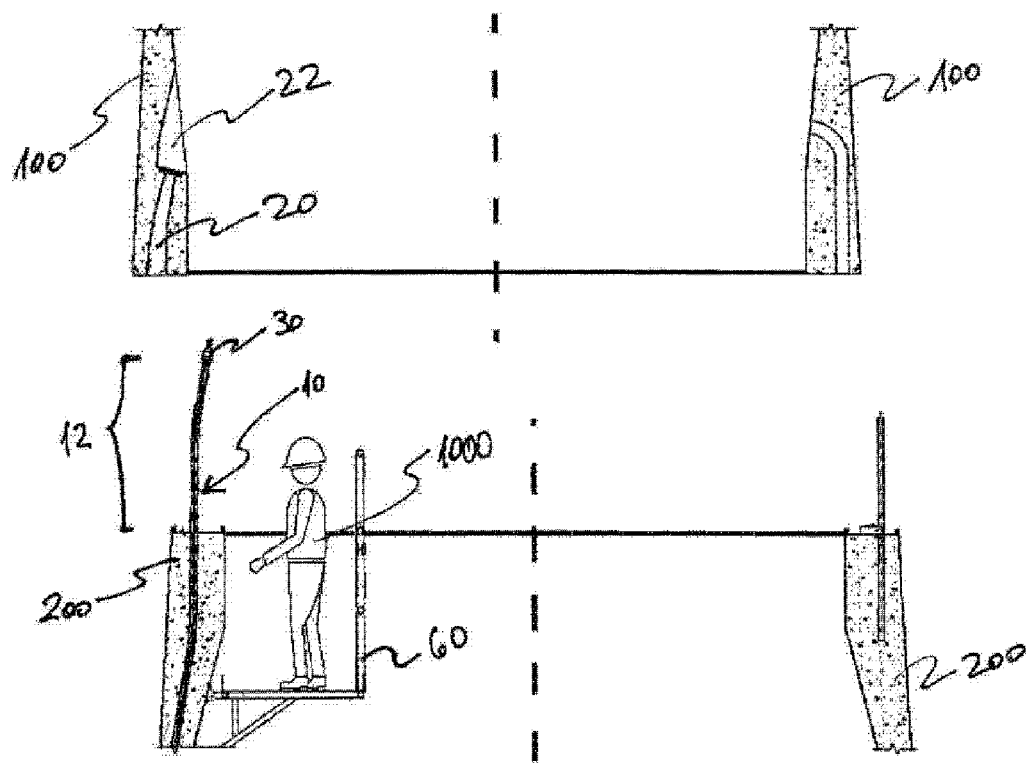
FIG. 2 is a schematic side elevation view of the horizontal joint of FIG. 1, in a transverse cross-section following line X-O-X' of FIG. 1, which represents an initial mutually facing condition of tubular segments following the procedure according to the invention.

FIG. 2 represents an initial condition of the procedure, wherein an upper tubular segment 100 and a lower tubular segment 200 that form part of a wind tower shaft are placed in a substantially coaxial position, at a certain distance from one another.

A cable 10 is embedded in the lower tubular segment 200 such that it has a portion 12 that protrudes upwards from said lower tubular segment 200. The cable 10 is a non-adhering prestressing sheathed cable. Although in this embodiment said protruding portion 12 of the cable 10 emerges vertically from said lower tubular segment 200, it is observed that said protruding portion 12 may curve and lose its verticality. The free end of said protruding portion 12 comprises and threading device 30 with appointed geometry and has a flexible projection that extends in a substantially coaxial direction with respect to said protruding portion 12. A through duct 20 is provided on the upper tubular segment 100 to receive said cable 10. Said receiving through duct 20 for the cable has a cross-section that narrows from the cable inlet opening and until the outlet, with a box 22 being provided on a face of said upper tubular segment 100 in correspondence with said outlet of the receiving through duct 20 for the cable.

Figure 10:
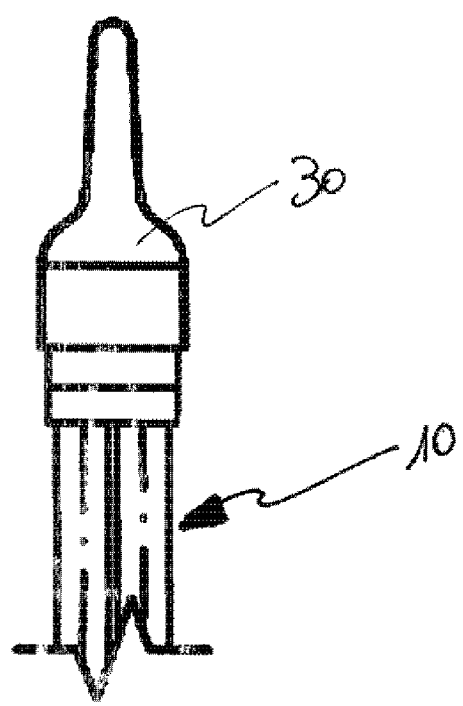
FIG. 10 is an enlarged view of a threading device according to this invention.

The cable 10 may consist in a single strand or comprise more than one strand. In the embodiment described in detail herein, the cable 10 comprises four strands and the threading device 30 has the function of grouping together the free ends of such strands, thus facilitating their handling. FIG. 10 shows an enlarged view of the detail of the free end of the protruding portion 12 of the cable 10 in order to illustrate said threading device 30 with a pointed geometry and a flexible projection as well as said strand grouping function, also acting as a cap.

FIG. 2 also shows in another section, on the perimeter of the joint, bar anchoring means 500 of the passive type that do not lie within the scope of this invention, and which are known in the art and shall not therefore be described in any more detail. Said bar anchoring means 500 are arranged on the horizontal joint, which illustrates that an assembly of a cable anchoring according to the present invention can be combined with other kinds of anchoring assemblies on a same horizontal joint.

FIG. 2 also shows a work platform 60 that may be temporary or permanent and which is joined to the head of the lower tubular segment 200. Said single work platform allows operators to carry out all the assembly work for the segments and to execute the corresponding horizontal joint, without requiring any other fixed or moveable work platform to be placed at a different height or on the other side of the tower wall.

Figure 3:
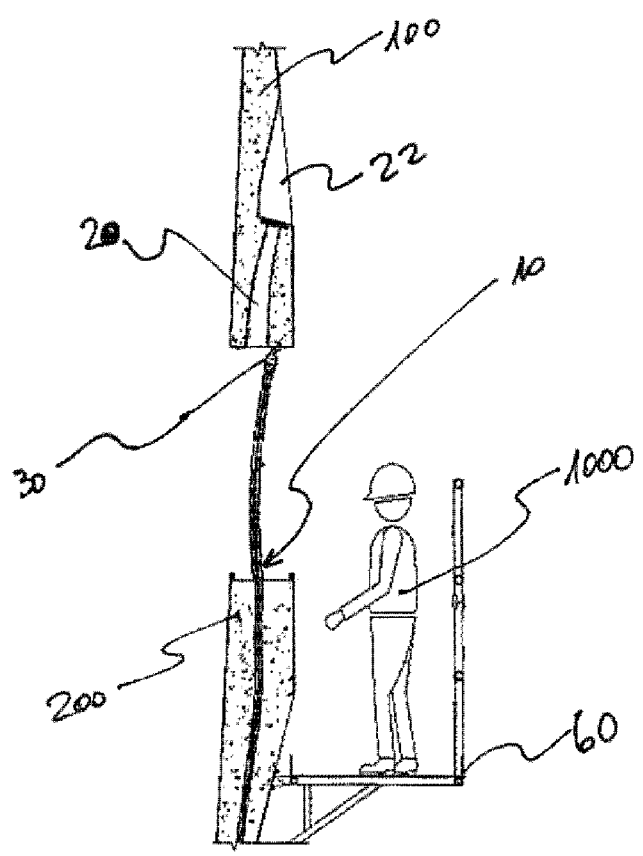
FIGS. 3-9 are schematic views in side elevation of the horizontal joint of FIG. 1, in a transverse cross-section following line X-O of FIG. 1, which represents successive steps of the procedure according to the invention.

FIG. 3 shows a subsequent moment in the procedure, wherein the upper tubular segment 100 has been approximated to the lower tubular segment 200 such that the threading device 30 has abutted with the upper tubular segment 100, at which time the approximation of the upper tubular segment 100 towards the lower tubular segment 200 is stopped.

Figure 4:
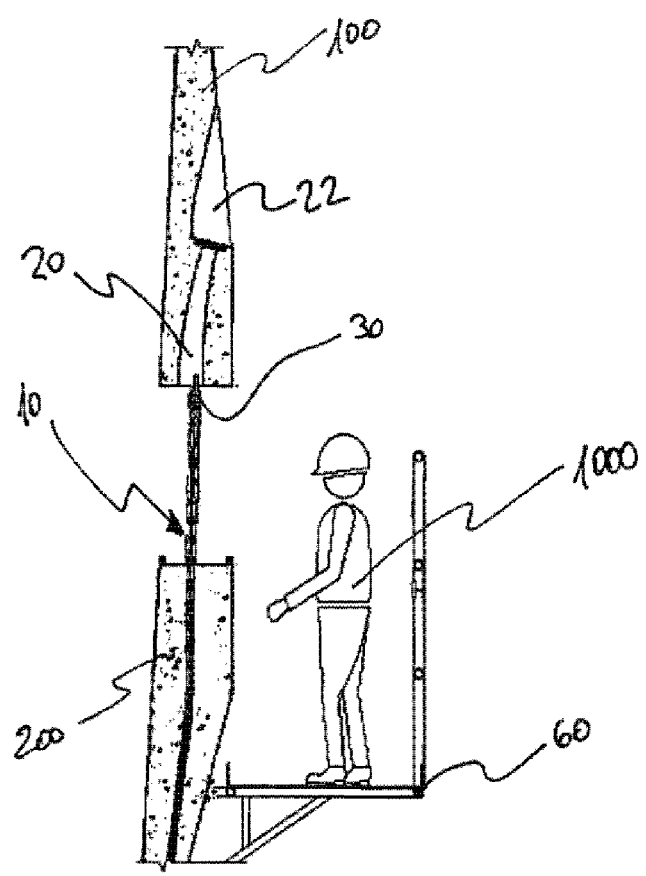

At this point the operator 1000 may move the protruding portion 12 of the cable 10 in order to place said threading device 30 at least partially threaded into the opening of said cable receiving through duct 20, until achieving a condition according to FIG. 4.

If the horizontal joint comprises one or more additional anchoring means 50 similar to the cable anchoring means 50 described here in detail, such as in the case of this embodiment, the operator shall then successively move the protruding part of each one of said anchoring means 50 as decided, in order to place each respective flexible projection threaded into the opening of a corresponding cable receiving through duct 20.

Figure 5:
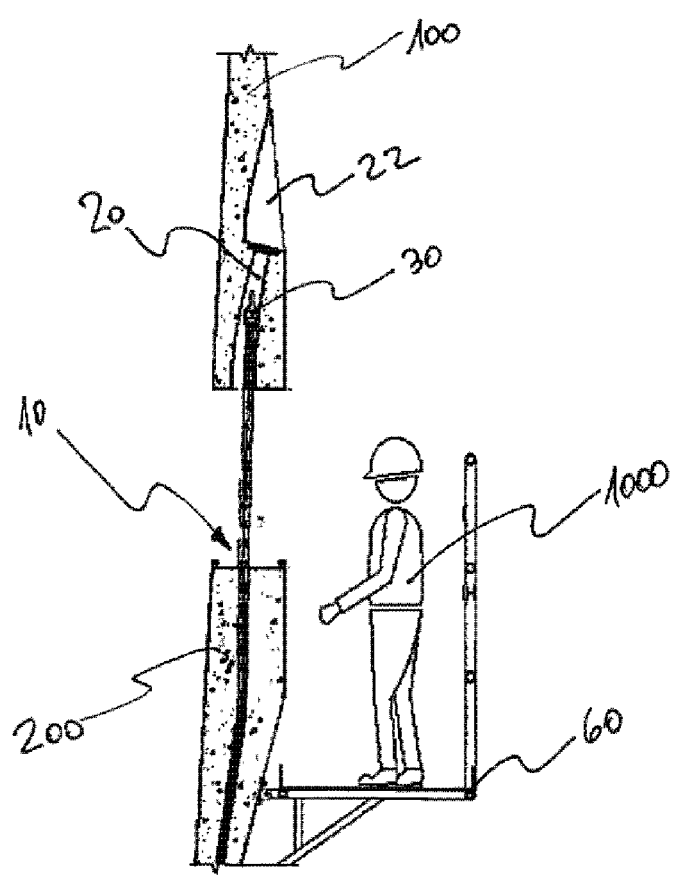
Figure 6:
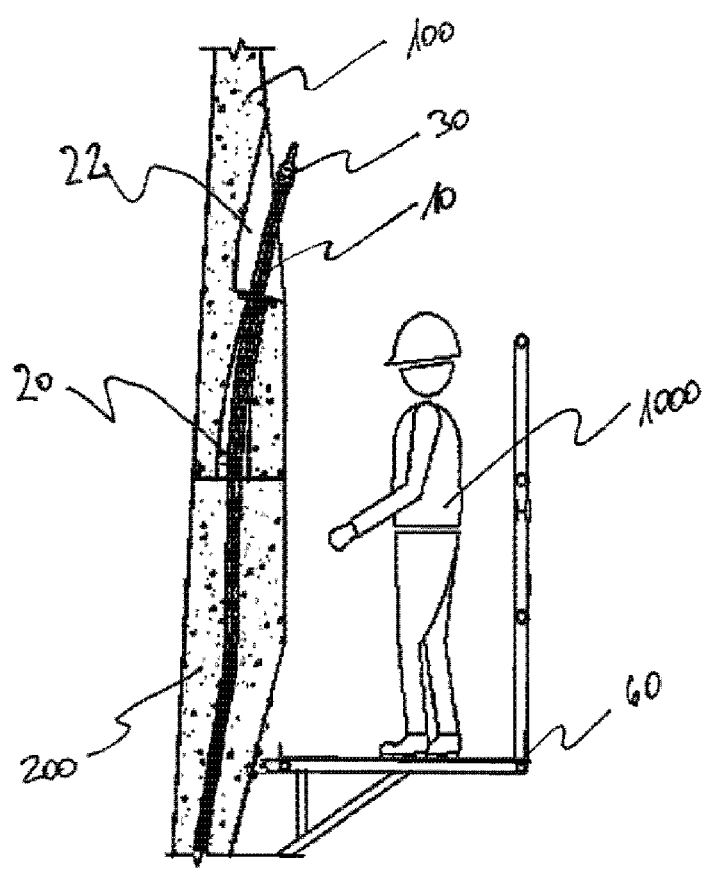

After this, the approximation of the upper tubular segment 100 towards the lower tubular segment 200 is resumed, and therefore the protruding portion 12 of the cable 10 is housed in the cable receiving through duct 20, as shown in FIG. 5, until reaching a condition wherein the upper tubular segment 100 rests upon the lower tubular segment 200 and the free end of the protruding portion 12 of the cable 10 extends beyond the cable receiving through duct 20 and is accessible as shown in FIG. 6.

In this embodiment, the upper tubular segment 100 rests directly upon the lower tubular segment 200, but the upper tubular segment 100 may rest on the lower tubular segment 200 via a layer of resin, a mortar poured on the horizontal joint or other provisional or definitive support means between both segments without extending beyond the scope of the present invention.

Figure 7:
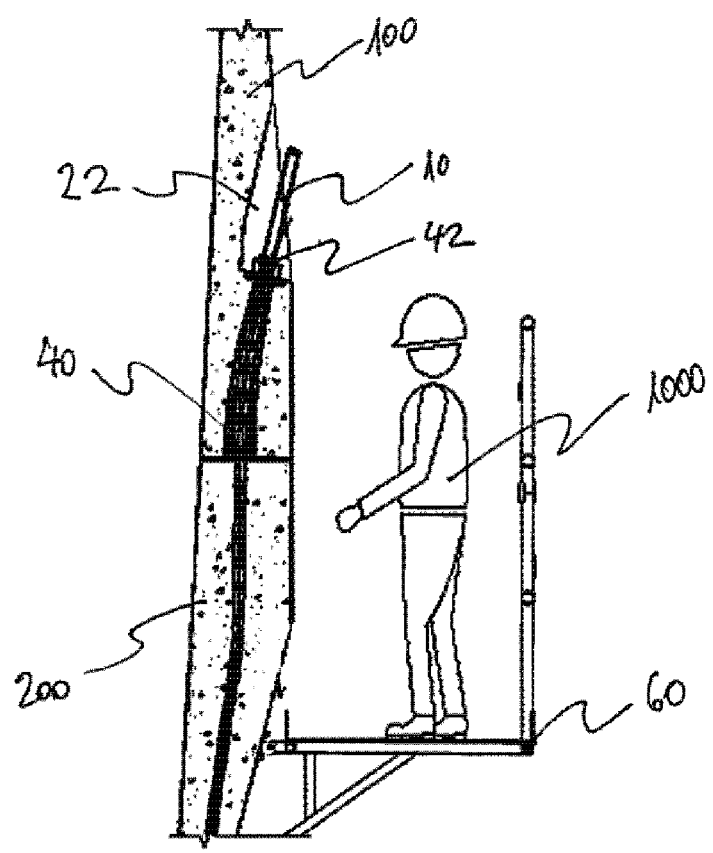

At this time, mortar 40 is poured inside the receiving through duct 20 and around the sheathe of said cable 10, and after that fastening means in the form of an abutting device 42 of the plate or wedge kind are applied to the free end of the protruding portion 12 of the cable 10, achieving the condition shown in FIG. 7.

Figure 8:
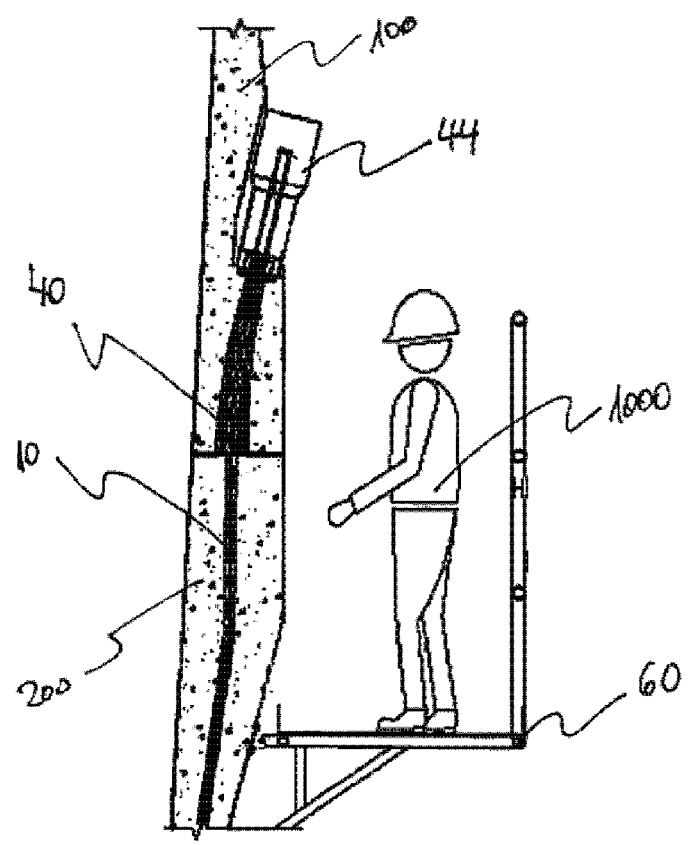

In this embodiment, the free end of the cable 10 that crosses the joint is its active end and having reached this point the cable is tightened by applying traction means to the free end of the protruding portion 12 of the cable 10, which is operated from the work platform 60 as shown in FIG. 8. In this embodiment, the traction means comprise a jack 44.

Figure 9:
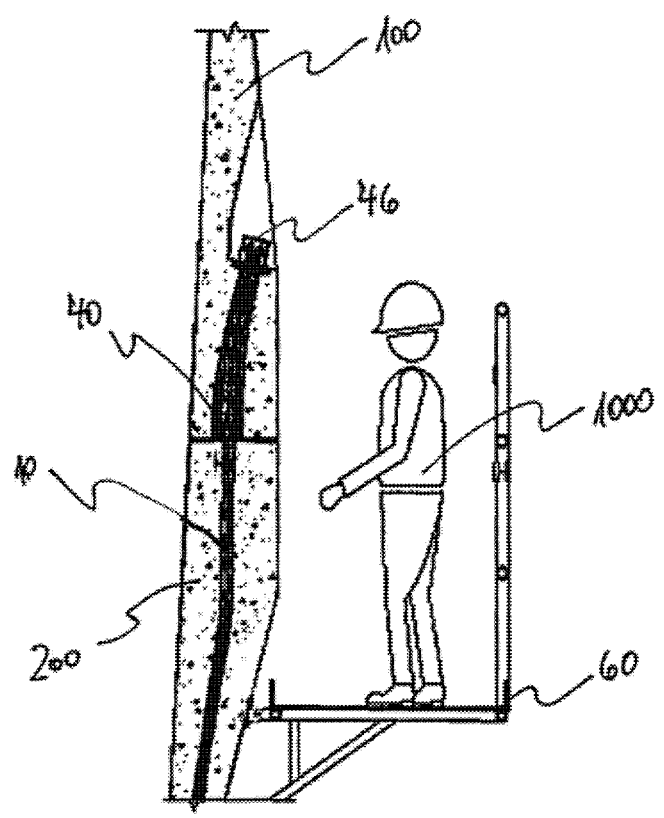

Finally, in this embodiment (although this is optional) we withdraw the jack 44 and then place a protective lid 46 on the free end of the protruding portion 12 of the cable 10, which results in the condition shown in FIG. 9.

Figure 11:
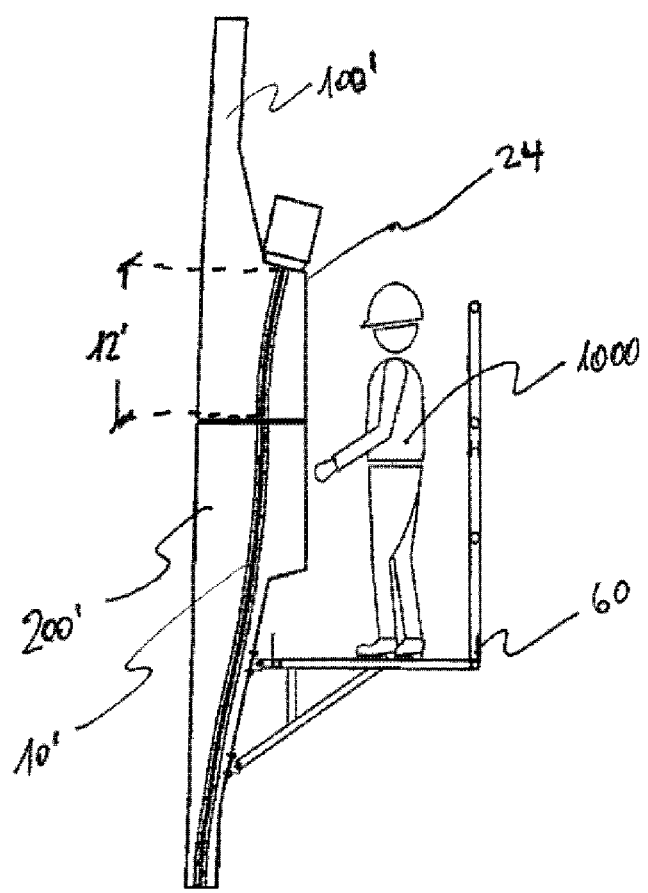
FIG. 11 is a similar view to that of FIG. 8 but illustrating a different embodiment of the cable anchoring means according to the invention.

FIG. 11 shows, as an illustration, an alternative embodiment of the cable anchoring means according to this invention, at a time in the procedure similar to that shown in FIG. 8. In this alternative embodiment, the corresponding upper tubular segment 100' does not comprise the box 22, but rather a rib 24 that provides a superficial support area on the wall of the upper tubular segment 100' that is substantially perpendicular to the axial development of the corresponding protruding portion 12' of the cable 10'.

Figure 12:
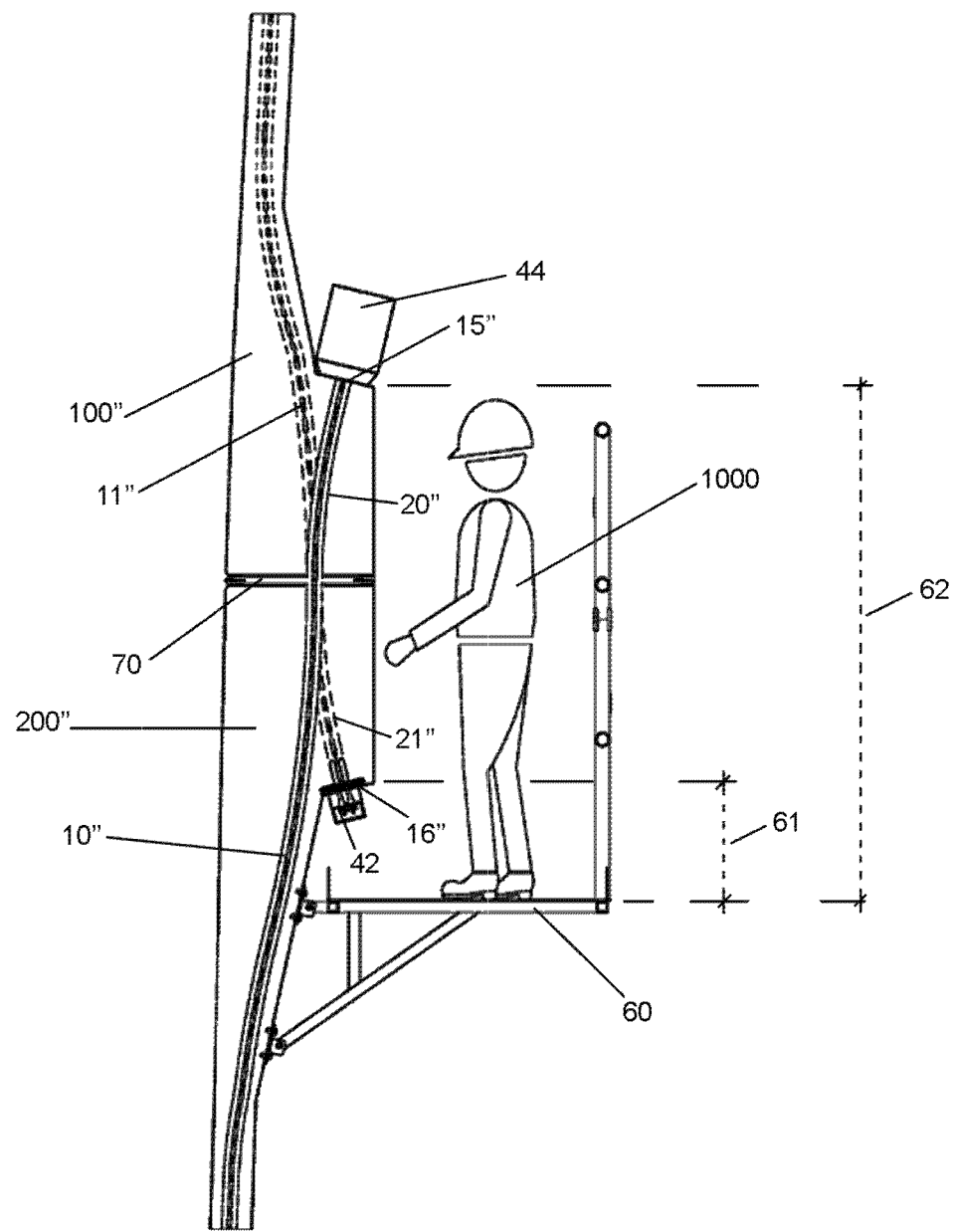
FIG. 12 is a similar view to those of FIGS. 8 and 11, but illustrating a different embodiment that uses cables protruding from both tower segments and therefore in both directions.
Figure 13:
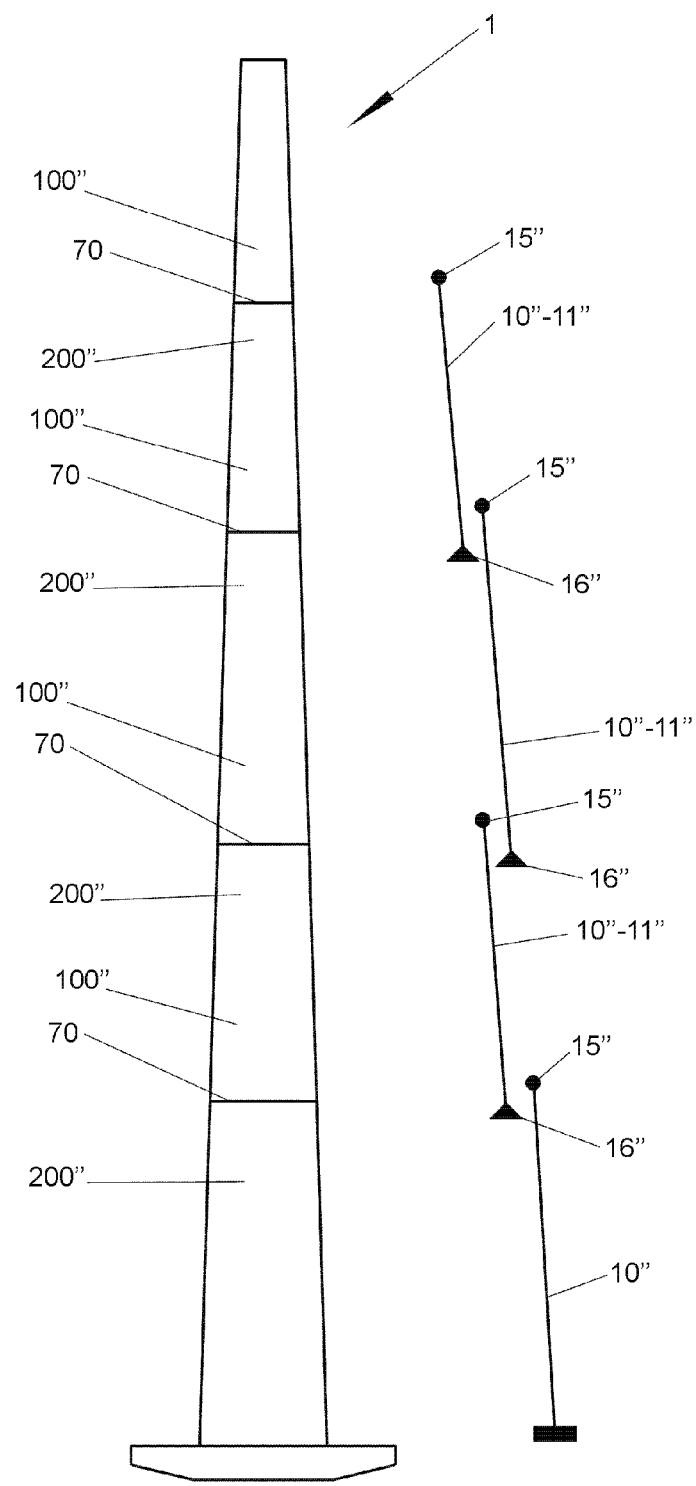
FIG. 13 is a general view in elevation of a tower showing a diagram on the side of the distribution of cables in the different segments and their crossing of the different horizontal joints in the tower in the case of an embodiment such as that represented in FIG. 12. The cables are represented on the side outside the tower for better understanding, but it must logically be understood that said cables are actually running inside the tower segments and through the corresponding horizontal joints between the segments.

FIGS. 12 and 13 relate to another alternative embodiment, wherein the horizontal joint 70 has anchoring cables 10" and 11" in both directions.

FIG. 12 shows a first family of cables 11" that extend from the base of the upper segment 100" and penetrate into through ducts 21" provided on the head of the lower segment 200", and also a second family of cables 10" that extend from the head of the lower segment 200" and penetrate inside through ducts 20" provided on the base of the upper segment 100".

In this case, the free ends 16" of the cables 11" of the first family that cross the horizontal joint 70 are passive ends and are logically located below the horizontal joint. On the other hand, the free ends 15" of the cables of the second family are active ends and are located above said horizontal joint. Therefore, the only cables that will be tightened from the work platform 60 of said horizontal joint 70 will be the cables 10" of the second family.

In this case, the active ends of the cables 11" of the first family, not shown in the figure, will cross another horizontal joint immediately above it, from which they will be tightened.

In this case, the passive ends of the cables 10" of the second family, not represented in FIG. 12, could be either embedded within the lower segment 100" or crossing another horizontal joint immediately below it and in which they would be applied the corresponding fastening means.

In this case, the configuration of the horizontal joint and the geometry of the cables crossing it would be such that the distance 61 between the work platform 60 and the free passive end 16" of the cables 11" of the first family is sufficiently large to allow placing the fastening means 42. At the same time, the distance 62 between the work platform 60 and the active free end 15" of the cables 10" of the second family is sufficiently reduced so that it is accessible for the workers 1000 on the work platform 60. Thus, the entire works for the assembly and materialisation of the joint are performed from said single work platform 60.

Finally, FIG. 13 shows a general elevation view of a tower 1 in which several horizontal joints 70 such as the one described in FIG. 12 are materialised. In particular it is a tower of five segments 100"-200". Shown on one side is the distribution of cables 10" and 11" in the different segments and their crossing of the different horizontal joints 70 of the tower in the case of an embodiment such as that shown in FIG. 12. The cables are represented on the side outside the tower for better understanding, but it must logically be understood that said cables are actually running inside the tower segments and through the corresponding horizontal joints between the segments. The figure indicates the active end 15" of each cable, from which they are tightened, and the passive end 16" of each cable, from which they are not tightened.

Naturally, maintaining the principle of the invention, the embodiments and construction details may vary widely with respect to those described and illustrated herein in a purely illustrative nature, without therefore falling outside the scope of the invention as defined in the accompanying claims.

As a non-limiting example, the embodiment described above relates to a joint between two annular concrete segments, but it would also be applicable to a joint established between a lower concrete tubular segment and a tubular segment immediately above it in metal, which would produce a tower usually called a hybrid tower in the art.

This invention would also be applicable for the connection of the lower segment of the tower to the foundation. The cables protruding from the head of the lower segment of the tower that bring together the horizontal joint between said lower segment and the segment immediately above it in the tower may be cables that penetrate the foundation at the other end or are coupled to the base of the lower segment of the tower with cables housed in the foundation.

Similarly, the embodiment described above in FIGS. 1 to 9 illustrates a horizontal joint comprising a plurality of cable anchoring means according to the invention in which each cable is embedded in the lower segment of the construction and each corresponding receiving through duct is provided on the upper segment of the construction, but the arrangement might be the reverse, such that each cable is embedded in the upper segment of the construction and each corresponding receiving through duct is provided on the lower segment of the construction.

Similarly, it must be understood that the term "annular" used in this description includes any closed cross-section segment shape, whether cylindrical, as is most common, or any other such as polygonal, elliptical or any other; as well as any constant or variable vertical development, such as a straight cylinder, a truncated cone, bulging, mixed, etc.

It must also be understood that the cable anchoring means for a horizontal joint described may be used in combination with other connection systems in the horizontal joint or for prestressing the tower segments. For example, the cables described in this invention may be used in conjunction with framework or prestressing bars that also attach the horizontal joint, or with external prestressing systems not housed in the walls of the tower segments, or they may be used at the same time as other prestressing cables in the tower segments that do not attach the joint, wither adherent or non-adherent cables, post-tightened (tightened after concreting) or pre-tightened (tightened in the mould prior to concreting).

The invention claimed is:

1. Cable anchoring means for a horizontal joint between a lower element and an upper element of a tower shaft, said cable anchoring means comprising: at least one cable formed by a plurality of strands, wherein said at least one cable is embedded in a first element that is one of said upper and lower elements, such that a protruding portion of said at least one cable protrudes from said first element, and also said at least one cable being a non-adhering prestressing sheathed cable, at least one receiving through duct provided in a second element which is the other of said upper and lower elements, said receiving through duct being intended to receive and house the protruding portion of said cable,
   fastening means to fasten said at least one cable in place; and a threading device attached to said protruding portion of said at least one cable and configured for movement through said at least one receiving through duct to thread said protruding portion into said at least one receiving through duct, said threading device comprising:
   a grouping part which is attached to end portions of said plurality of strands forming said at least one cable; and
   a projecting part which protrudes from said grouping part in a substantially coaxial direction with respect to said protruding portion of said at least one cable, wherein:
   said projecting part comprises flexible geometry; a mean thickness of said projecting part is smaller than a mean thickness of said grouping part, and
   a thickness of the threading device is smaller than a thickness of the at least one receiving through duct provided in the second element.

2. Cable anchoring means for a horizontal joint according to claim 1, wherein said threading device is applicable in said protruding portion of said at least one cable in a detachable manner.

3. Cable anchoring means for a horizontal joint according to claim 1, wherein said flexible part of said threading device is made of plastic polymer or rubber.

4. Cable anchoring means for a horizontal joint according to claim 1, wherein said at least one receiving through duct has a flared inlet stretch such that the cross-section of said receiving through duct narrows from the cable inlet opening of said at least one receiving through duct, over at least a length of said at least one receiving through duct.

5. Cable anchoring means for a horizontal joint according to claim 1, wherein said fastening means comprise an abutting device comprising a plate or a wedge.

6. Cable anchoring means according to claim 1, wherein said fastening means comprise mortar poured into said at least one receiving through duct.

7. Cable anchoring means for a horizontal joint according to claim 1, wherein said at least one cable does not protrude vertically from the element in which it is embedded.

8. Cable anchoring means for a horizontal joint according to claim 1, further comprising a work platform joined to a head of said lower element in order to carry out assembly and materialization operations for the horizontal joint.

9. Cable anchoring means for a horizontal joint according to claim 8, further comprising: a first family of cables that protrude from a base of the upper element and penetrate into through ducts provided on a head of the lower element, a free end that crosses the joint being a passive end, which is located below the joint, a second family of cables that protrude from the head of the lower element and penetrate into through ducts provided on the base of the upper element, the free end that crosses the joint being its active end, which is located above the joint; and wherein: the distance from the work platform to the passive ends of the cables of the first family is greater than the size of a fastening means to be provided on said passive ends, thus enabling their application from said work platform, the distance from the work platform to the active ends of the cables of the second family does not exceed an accessible work distance for the workers operating on said work platform, thus enabling the tightening of the cables of the second family from said work platform.

10. Cable anchoring means for a horizontal joint according to claim 8, wherein said work platform is temporary and removable.

11. A cable anchoring procedure for a horizontal joint between a lower element and an upper element of a tower shaft, said cable anchoring procedure comprising the following steps:
a) providing said upper and lower elements;
b) providing cable anchoring means, comprising:
at least one cable farmed by a plurality of strands, wherein the at least one cable is embedded in a first element, that is one of said upper and lower elements, such that a protruding portion of said at least one cable protrudes from said first element,
at least one receiving through duct provided in a second element which is the other of said upper and lower elements, said at least one receiving through duct being intended to receive the protruding portion of said cable; and
fastening means to fasten said cable in place;
c) moving said upper element in a substantially vertical manner towards said lower element and threading said cable into said at least one receiving through duct until said upper element rests, either directly or using mortar, on said lower element, wherein
said cable anchoring means further comprises threading device attached to said protruding portion of said cable and comprising:
a grouping part which is attached to end portions of the plurality of strands forming the at least one cable a projecting part which protrudes from the grouping part in a substantially coaxial direction with respect to the protruding portion of the cable, wherein:
said projecting part comprises flexible geometry;
a mean thickness of the projecting part is smaller than a mean thickness of the grouping part; and
a thickness of the threading device is smaller than a thickness of the at least one receiving through duct provided in the second element; and
wherein step c) also comprising the following sub-steps:
c.1) stopping the substantial vertical movement or said upper element towards said lower element when the distance between the lower element and the upper element is such that said threading device can be placed intersecting a cross-sectional area of a cable inlet opening of said at least one receiving through duct;
c.2) placing said projecting part of said threading device on the cable inlet opening of said receiving through duct:
c.3) resuming the substantially vertical movement of said upper element towards said lower element such that said threading device is moved through said receiving through duct to thread the protruding portion of said at least one cable into said at least one receiving through duct; said procedure also comprising, before step c) the step of:
d) attaching a work platform to a head of said lower element in order to carry out the works necessary for the assembly and execution process for the joint;
said procedure also comprising, after step c), the step of:
e) applying said fastening means to a free end of the protruding portion of the cable.

12. A cable anchoring procedure for a horizontal join according to claim 11, wherein the free end of said at least one cable that crosses the joint is its active end and wherein the procedure also comprises, after step c) the step of:
f) applying traction on said at least one cable thus applying a prestressing force on said horizontal joint, operating from the work platform provided in step d).

13. A cable anchoring procedure for a horizontal joint according to claim 11, wherein the free end of said at least one cable that crosses the joint is its passive end and wherein the procedure also comprises, alter step c), the step of:
f) applying traction on said at least one cable thus applying a prestressing force on said horizontal joint, not operating from the work platform provided in step d).

14. A cable anchoring procedure for a horizontal joint according to claim 12, also comprising, after step c) and before step f) if the path of said protruding portion is curved in s final condition, the step of; g) filling with a hardening material, a mortar or cement slurry, said at least one through duct that houses the protruding portion of said at least one cable.

15. A cable anchoring procedure for a horizontal joint according to claim 11, wherein said threading device is applied on said protruding portion of said at least one cable in a detachable manner.

16. A cable anchoring procedure for a horizontal joint according to claim 12, wherein, in step f) traction is applied on the at least one cable by application of traction means comprising a jack.

17. A cable anchoring procedure for a horizontal joint according to claim 11, wherein said fastening means comprise an anchor plate with at least one wedge for holding the plurality of strands of said at least one cable.

* * * * *